(12) United States Patent
Mazzochette et al.

(10) Patent No.: US 8,452,187 B2
(45) Date of Patent: May 28, 2013

(54) BI-DIRECTIONAL, COMPACT, MULTI-PATH AND FREE SPACE CHANNEL REPLICATOR

(75) Inventors: Joseph Mazzochette, Cherry Hill, NJ (US); Edward J. MacMullen, New Egypt, NJ (US); Jerome Lomurno, Moorestown, NJ (US)

(73) Assignee: Eastern Optx Inc., Morrestown, NJ (US)

( * ) Notice: Subject to any disclaimer, the term of this patent is extended or adjusted under 35 U.S.C. 154(b) by 173 days.

(21) Appl. No.: 12/958,774

(22) Filed: Dec. 2, 2010

(65) Prior Publication Data

US 2012/0141133 A1    Jun. 7, 2012

(51) Int. Cl.
*H04B 10/00*  (2006.01)
*H04B 10/08*  (2006.01)
*H04J 14/02*  (2006.01)

(52) U.S. Cl.
CPC .................................. *H04J 14/0227* (2013.01)
USPC .............................. 398/161; 398/19; 398/115

(58) Field of Classification Search
CPC ................................................... H04J 14/0227
USPC ................. 398/214, 161; 342/172; 356/369; 359/344; 385/16
See application file for complete search history.

(56) References Cited

U.S. PATENT DOCUMENTS

| | | |
|---|---|---|
| 5,177,488 A | 1/1993 | Wang et al. |
| 5,210,807 A | 5/1993 | Ames |
| 5,339,087 A | 8/1994 | Minarik |
| 5,518,400 A | 5/1996 | Otoide et al. |
| 5,973,638 A | 10/1999 | Robbins et al. |
| 6,067,042 A | 5/2000 | Lee |
| 6,643,795 B1 | 11/2003 | Sicola et al. |
| 6,724,730 B1 | 4/2004 | Minarsky et al. |
| 6,804,047 B2* | 10/2004 | Byun et al. .................... 359/344 |
| 7,136,587 B1 | 11/2006 | Davis et al. |
| 7,672,669 B2 | 3/2010 | Alexander et al. |
| 7,782,250 B2* | 8/2010 | Shih et al. ..................... 342/172 |
| 7,805,078 B1* | 9/2010 | Gerszberg et al. ............ 398/115 |
| 2003/0161637 A1* | 8/2003 | Yamamoto et al. ........ 398/167.5 |
| 2003/0202571 A1 | 10/2003 | Kearney et al. |
| 2004/0184713 A1* | 9/2004 | Sato et al. ....................... 385/16 |
| 2007/0103684 A1* | 5/2007 | Shahar .......................... 356/369 |

OTHER PUBLICATIONS

A. Paolella, S. Malone, T. Higgins, B. Scheiner, E. Adler, "Fiber optic dual delay line for a multi-mode radar test target simulator," Microwave Symposium Digest, 1993., IEEE MTT-S International, 1993, vol. 2, pp. 1059-1062.

P. Kanagaratnam, S. Gogineni, T. Plummer and B. Parthasarathy, "A Wideband Radar for Mapping Internal Layers in the Polar Icesheets for Estimating Accumulation Rate," The University of Kansas, Radar Systems and Remote Sensing Laboratory, IEEE, 2002.

* cited by examiner

*Primary Examiner* — Danny Leung
*Assistant Examiner* — Claudius Taylor
(74) *Attorney, Agent, or Firm* — Lowenstein Sandler LLP

(57) ABSTRACT

An apparatus for simulating radio frequency (RF) signal propagation characteristics in a wireless communication network is disclosed. The apparatus includes a first RF terminal and a second RF terminal. A first optical modulator is in electrical communication with the first RF terminal. An optical delay line is in optical communication with the first optical modulator. A first optical demodulator is in optical communication with the optical delay line and in electrical communication with the first RF terminal. A second optical demodulator is in optical communication with the optical delay line and in electrical communication with the second RF terminal. A second optical modulator is in electrical communication with the second RF terminal and in optical communication with the optical delay line.

16 Claims, 10 Drawing Sheets

BI-DIRECTIONAL, COMPACT, MULTI-PATH AND FREE SPACE CHANNEL REPLICATOR

FIELD OF THE INVENTION

The present invention relates generally to an apparatus for simulated testing of wireless communications networks, and more particularly, to an apparatus that employs radio electrical-to-optical-to-electrical components configured to perform optical signal processing to simulate radio frequency (RF) signal propagation characteristics in a wireless communication network.

BACKGROUND OF THE INVENTION

The explosion of wireless digital communication networks and equipment has created a need for compressing more information into a finite spectrum. There is also a need for greater security in communications for both military and commercial applications. As a result, system architecture designers have been prompted to develop wireless communication systems that have increasingly complex modulation, timing, and encryption schemes. Throughout the communication system development process, it is necessary to test system performance by measuring the reliability of transmission and reception of information in the presence of multiple transceivers, in different locations, at different power levels, in the presence of unwanted interferers, reflecting obstacles, and under a variety of environmental conditions. A rapidly operating and sophisticated test apparatus is needed to optimize a transmission system under development and to perform a preliminary qualification of the system prior to expensive and time-consuming field trials.

Prior art test systems for rapid testing between two or more transceivers have included system emulators. A system emulator produces an output that is based upon a pre-programmed emulator response, an input signal, and selected emulator setting (e.g., distance, environment, other transceivers, etc.). Unfortunately, system emulators require information about the system under test in order to produce an accurate output. This requirement presents several problems. First, a new system emulator may need to be designed for each new modulation scheme type for the transmission system under test (SUT). Secondly, a system emulator may introduce errors that produce false positives or negatives in the performance of the SUT. Finally, a system emulator may not replicate a communication environment accurately as a result of interactions between multiple signals at different distances and power levels, thereby resulting in erroneous emulator output(s).

Accordingly, what would be desirable, but has not yet been provided, is an apparatus for simulating RF signal propagation characteristics in a wireless communication network that overcomes the deficiencies of prior art system emulators.

SUMMARY OF THE INVENTION

The above-described problems are addressed and a technical solution is achieved in the art by providing an apparatus for simulating RF signal propagation characteristics in a wireless communication network, the apparatus comprising: a first RF terminal; a second RF terminal; a first optical modulator in electrical communication with the first RF terminal; an optical delay line in optical communication with the first optical modulator; a first optical demodulator in optical communication with the optical delay line and in electrical communication with the first RF terminal; a second optical demodulator in optical communication with the optical delay line and in electrical communication with the second RF terminal; and a second optical modulator in electrical communication with the second RF terminal and in optical communication with the optical delay line. The apparatus may further comprise: a first optical filter in optical communication with the optical delay line and the a first optical demodulator; and a second optical filter in optical communication with the optical delay line and the second optical demodulator; wherein: the first optical modulator is configured to transmit a first wavelength; the first optical filter is configured to transmit a second wavelength; the second optical filter is configured to transmit the first; and the second optical modulator is configured to transmit the second wavelength.

According to an embodiment of the present invention, the first optical modulator and the second optical modulator may each comprise: an RF isolator; a laser in electrical communication with the RF isolator; and a circulator in optical communication with the laser. The first optical demodulator and the second optical demodulator may each comprise: a dispersion compensator in optical communication with the circulator; a detector in optical communication with the dispersion compensator; and a gain stage in optical communication with the detector and in electrical communication with the RF isolator.

According to an embodiment of the present invention, the optical delay line produced may be a fixed delay or a variable delay. The optical delay line may comprise: a plurality of optical delay lines configured in a series configuration, wherein a delay associated with each of the plurality of optical delay lines increases progressively; a plurality of bypass stubs each associated with a corresponding one of the plurality of optical delay lines; a plurality of two-position optical switches each configured to switch between one of the plurality of optical delay lines and a corresponding one of the plurality of bypass stubs; a global bypass stub associated with an input and an output of the plurality of optical delay lines arranged in a series configuration; and at least one two-position optical switch configured to switch between the global bypass stub associated with the plurality of optical delay lines and at least one of the plurality of bypass stubs and the plurality of optical delay lines. The optical delay line may comprise: a plurality of optical delay lines configured in a parallel configuration, wherein a delay of each of the plurality of optical delay lines increases progressively; and at least one multi-position optical switch configured to switch among each of the plurality of optical delay lines.

According to an embodiment of the present invention, the apparatus may further comprise a variable radio frequency (RF) attenuator in electrical communication with an RF portion of at least one of the first optical modulator, the second optical modulator, the first optical demodulator, and the second optical demodulator. The apparatus may further comprise a variable optical attenuator in optical communication with an optical portion of at least one of the first optical modulator, the second optical modulator, the first optical demodulator, and the second optical demodulator.

According to an embodiment of the present invention, the apparatus may further comprise a third RF terminal; a fourth RF terminal; a third optical modulator in electrical communication with the third RF terminal; a second optical delay line in optical communication with the third optical modulator; a third optical demodulator in optical communication with the second optical delay line and in electrical communication with the third RF terminal; a fourth optical demodulator in optical communication with the second optical delay line and in electrical communication with the fourth RF terminal; a fourth optical modulator in electrical communication with the fourth RF terminal and in optical communication with the second optical delay line; a variable radio frequency (RF) attenuator in electrical communication with an RF portion of at least one of the third optical modulator, the fourth optical modulator, the third optical demodulator, and the fourth optical demodulator; a variable optical attenuator in optical communication with an optical portion of at least one of the third optical modulator, the fourth optical modulator, the third optical demodulator, and the fourth optical demodulator; and at least one switch configured to switch between the first RF terminal and the third RF terminal. The apparatus may further comprise: a second optical delay line in optical communication the first optical modulator; and a second variable optical attenuator in optical communication with the second optical delay line and the second a second optical modulator.

The above-described problems are addressed and a technical solution is achieved in the art by providing an apparatus for simulating RF signal propagation characteristics in a wireless communication network, the apparatus comprising: an RF terminal; a first optical modulator in electrical communication with the RF terminal; an optical delay line in optical communication with the first optical modulator; a first demodulator in optical communication with the optical delay line and in electrical communication with the RF terminal; and an N-way optical combiner in optical communication with the optical delay line, wherein N is at least two. The N-way optical combiner may comprise a plurality of 1:N-1 optical splitter-combiners, wherein each of the plurality of 1:N-1 optical splitter-combiners is in optical communication with another of the plurality of 1:N-1 optical splitter-combiners.

According to an embodiment of the present invention, the apparatus may further comprise a second RF terminal; a second optical modulator in electrical communication with the second RF terminal; a second optical delay line in optical communication with the second optical modulator and the N-way optical combiner; a second optical demodulator in optical communication with the second optical delay line and in electrical communication with the second RF terminal.

The above-described problems are addressed and a technical solution is achieved in the art by providing an apparatus for simulating RF signal propagation characteristics in a wireless communication network, the apparatus comprising: an RF terminal; an optical modulator in electrical communication with the RF terminal; an optical delay line in optical communication with the optical modulator, an optical demodulator in optical communication with the optical delay line and in electrical communication with the RF terminal; and an N×N RF switch matrix having a first input in electrical communication with the first optical modulator, wherein N is at least two. The apparatus may further comprise a 3-way optical splitter/combiner having a first input in optical communication with the optical delay line. The apparatus may further comprise a second optical demodulator in optical communication with a second input of the 3-way optical splitter/combiner and in electrical communication with a second input of the N×N RF switch matrix; and a second optical modulator in optical communication with the second input of the 3-way optical splitter/combiner and in electrical communication with the second input of the N×N RF switch matrix.

The above-described problems are addressed and a technical solution is achieved in the art by providing an apparatus for simulating RF signal propagation characteristics in a wireless communication network, the apparatus comprising: a first RF terminal; a second RF terminal; a first optical modulator in electrical communication with the first RF terminal; a first optical delay line in optical communication with the first optical modulator; a first optical demodulator in optical communication with the first optical delay line and in electrical communication with the second RF terminal; a second optical modulator in electrical communication with the second RF terminal; a second optical delay line in optical communication with the second optical modulator; and a second optical demodulator in optical communication with the second optical delay line and in electrical communication with the first RF terminal.

BRIEF DESCRIPTION OF THE DRAWINGS

The present invention will be more readily understood from the detailed description of exemplary embodiments presented below considered in conjunction with the attached drawings in which like reference numerals refer to similar elements and in which.

It is to be understood that the attached drawings are for purposes of illustrating the concepts of the invention and may not be to scale.

DETAILED DESCRIPTION OF THE INVENTION

Embodiments of the present invention employ an exemplary apparatus for simulating RF signal propagation characteristics in a wireless communication network. Embodiments of the present invention replicate a radio transmission environment or channel, including the effects of propagation loss, reflections from one or more stationary or moving obstacles, ground and sea clutter, weather conditions, and other perturbations common to RF and microwave communication links. The apparatus provides for the simultaneous and uninterrupted transmission and reception of two or more transceivers. The exemplary apparatus simulates a variety of conditions for transceivers that may be mobile or stationary, ground, sea, or air based, and provides for variation in the distance between transceivers in real time with a continuous signal stream. The apparatus effectively provides a compact, lab-based simulator for a multi-node radio channel which may be used to test and verify performance of a variety of transmission schemes and modulation protocols.

Certain embodiments of the present invention replace a conventional system emulator with a system propagation path replicator (PPR). A PPR reproduces the propagation path associated with a particular communication system environment in terms of frequency range, frequency response, delay, loss, multipath, interferers, weather, multiple desired transceivers, and other conditions characteristic of the path. In addition, a PPR replicator needs to be compact so that it may be used in a laboratory setting. The cost of the PPR needs to be low relative to the expense of time-consuming field trials.

Figure 1:
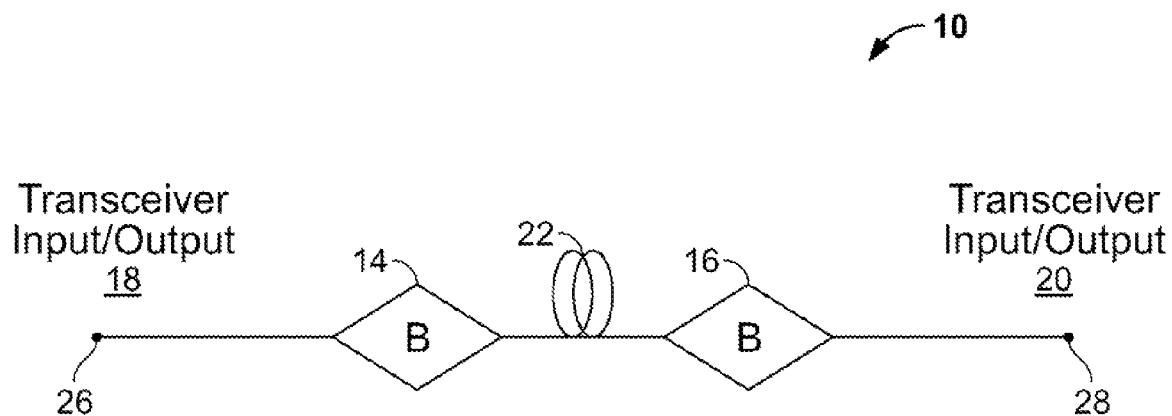
FIG. 1 is a circuit block diagram of an exemplary path propagation replicator (PPR), according to an embodiment of the present invention.

FIG. 1 is a circuit block diagram of an exemplary PPR 10, according to an embodiment of the present invention. The exemplary PPR 10 shown in FIG. 1 may be implemented as a fiber optic transmission lines configuration (herein the FOTL 10) that comprises a pair of bi-directional modulators/demodulators 14, 16, (i.e., a first and second bi-directional optical modulator/demodulator) that converts incoming or outgoing RF inputs/outputs of RF transceivers 18, 20 to/from an optical signal. The FOTL 10 of FIG. 1 provides for a single bi-directional link having a fixed delay and amplitude for the transceivers 18, 20. The optical signal is configured to propagate over the FOTL 10 in the form of a fiber optic delay line 22 having a predetermined transmission delay. An exemplary FOTL may have any one or combination of the following desired characteristics: (1) Low Loss (0.2 dB, single mode, 1550 nm); (2) Slow propagation velocity (1.5:1, reduced propagation rate requires less fiber for a given delay); (3) Low Dispersion (4 ps/nm-km, single mode, 1550 nm); (4) Small size (250 micron diameter for single mode fiber); (5) Light weight (0.5 kg/km); (6) Wide band width; (7) Rugged; (8) Low Cost ($50/km); and (9) Availability of low cost optical signal processing components (OSPC).

In operation, the transceivers 18, 20 are each respectively connected to one of the two PPR system ports 26, 28. An electrical signal emanating from one or both of the transceivers 18, 20 is converted to an optical signal by one or both of the bi-directional modulators/demodulators 14, 16, injected into the fiber optic delay line 22, and then converted back to an electrical signal by the other of the bi-directional modulators/demodulators 16, 14. The bi-directional modulators/demodulators 14, 16 (labeled "B") route the signals based on the transmission direction (e.g., from the fiber optic delay line 22 or from the transceiver 18). According to an embodiment of the present invention, signals may be transmitted and received in a full duplex mode. Since signals travel over the same the fiber optic delay line 22, channel characteristics (loss, delay, dispersion, etc.) are identical.

Figure 2A:
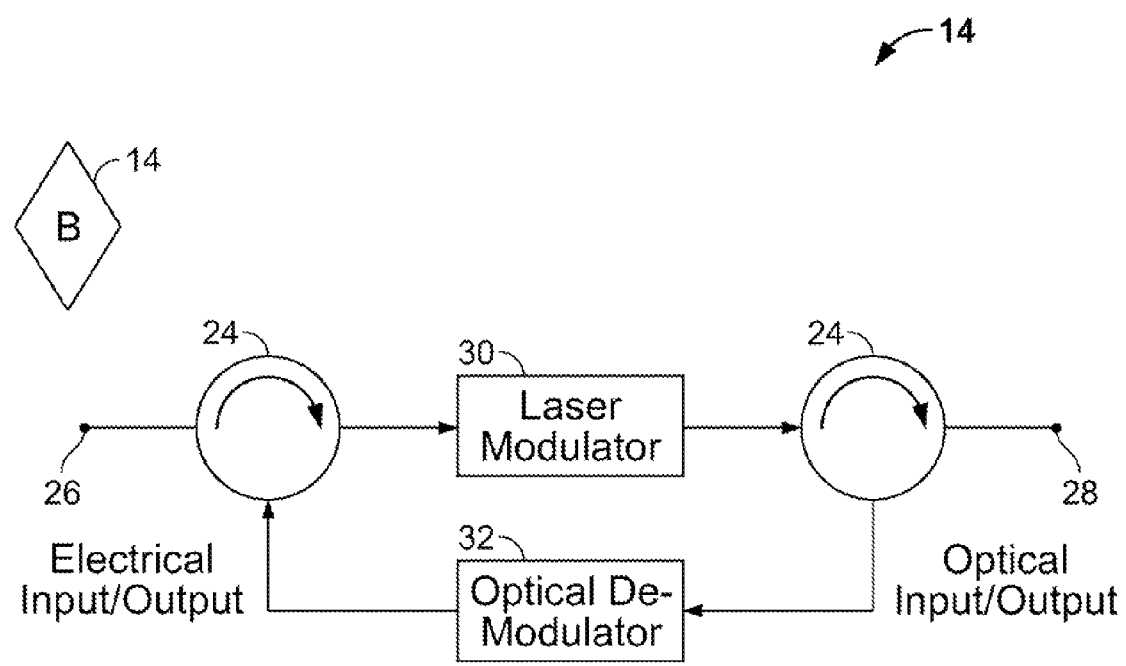
FIG. 2A shows a simplified schematic block diagram of the bi-directional modulators/demodulator of FIG. 1, according to an embodiment of the present invention.
Figure 2B:
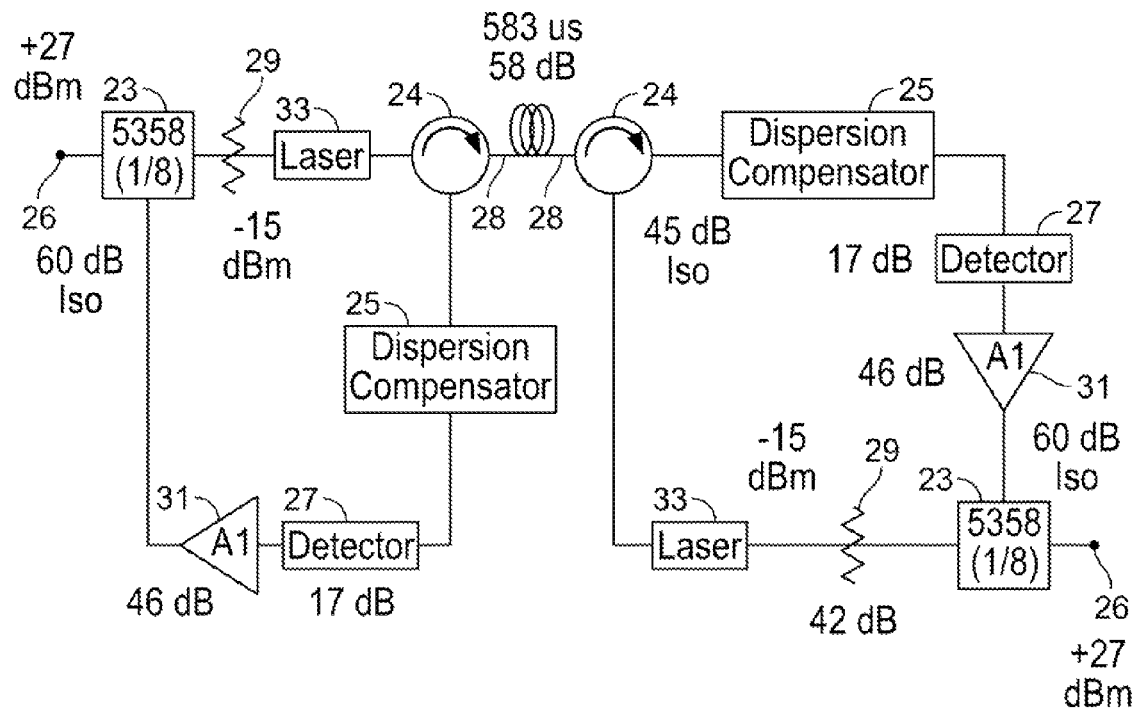
FIG. 2B shows a more detailed schematic block diagram of the bi-directional modulators/demodulator of FIGS. 1 and 2A, according to an embodiment of the present invention.

FIG. 2A shows a simplified schematic block diagram of the bi-directional optical modulator/demodulator 14 of FIG. 1, according to an embodiment of the present invention. FIG. 2B shows a more detailed schematic block diagram of the bi-directional modulators/demodulator of FIGS. 1 and 2A, according to an embodiment of the present invention. FIGS. 2A and 2B depict the routing scheme, which provides a required signal separation, and the modulation and demodulation of an electrical signal. The bi-directional optical modulator/demodulator 14 includes, a laser modulator 30 for converting an electrical signal received on an input port 26 to an optical signal transmitted via an output port 28. The laser modulator 30 comprises an RF isolator 23, a laser 33, and a circulator 24 for guaranteeing that a signal entering one port exits the next port. The bi-directional optical modulator/demodulator 14 further includes an optical demodulator 32 for converting an optical signal on an input port 28 to an electrical signal received on an output port 26. The optical demodulator 32 comprises includes the circulator 24, a dispersion compensator 25 to correct for portions of the laser signal arriving before other portions (dispersion), a detector 27, an electrical gain stage 31, and the RF isolator 23, connected as shown. The electrical gain stage 31 may be added to a detector 27 output to compensate for long delay loss. Attenuation devices 29 may be inserted after the output of the RF Isolator 23 to protect the laser 33. Additional isolators may be added to the detector output to reduce distortion and protect the detector from large transmit signals.

Practical limitations of the electrical circulator construction of the bi-directional optical modulator/demodulator 14 of FIGS. 2A and 2B typically limit its useful electrical frequency range to one octave. Larger bandwidths can be achieved if the circulator 24 is replaced with a directional coupler at a cost of higher insertion loss.

The embodiments of the FOTL 10 shown in FIGS. 1 and 2A-2B each have a fixed optical delay. However, in many circumstances it is desirable to include a variable optical delay in the FOTL 10. A variable delay may be employed to simulate a moving transceiver, mimic weather effects (e.g., Doppler shift), or provide a range of channel distance tests. The variable optical delay may be continuous or discrete.

Figure 3:
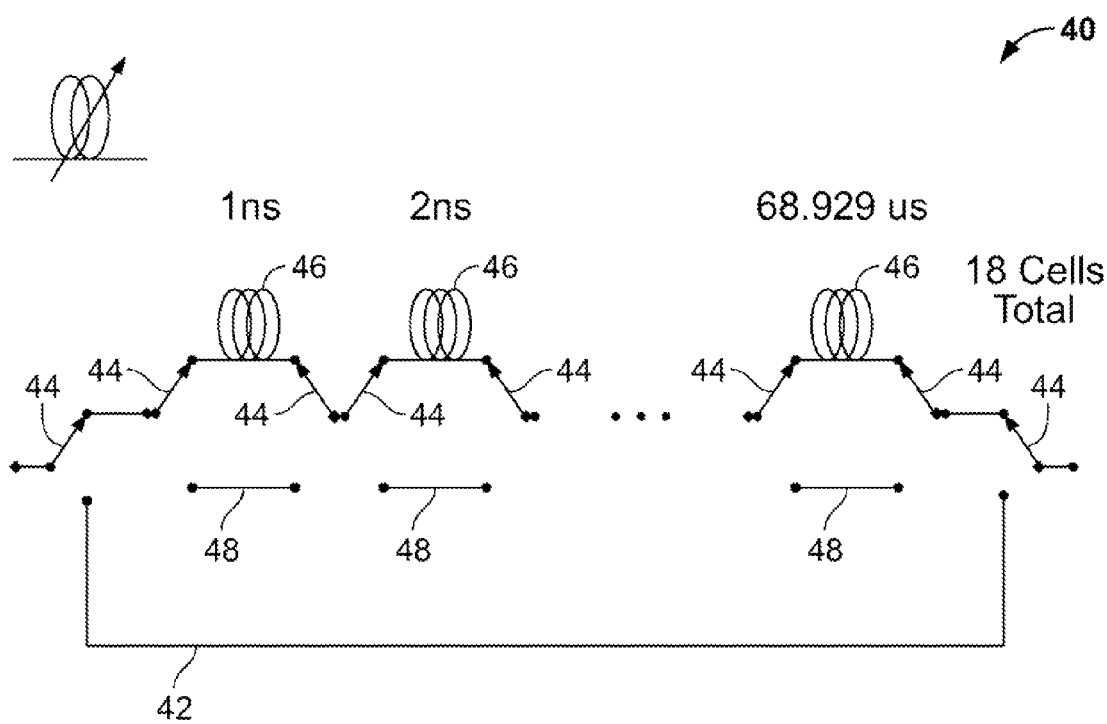
FIG. 3 depicts a schematic block diagram of an exemplary progressive or "continuous" variable optical delay line, according to an embodiment of the present invention.

FIG. 3 depicts a schematic block diagram of an exemplary progressive or "continuous" variable optical delay line 40, according to an embodiment of the present invention. The variable optical delay line 40 include a single optical bypass 42 having a fixed delay configured in parallel with a plurality of make-before-break optical switches 44, a plurality of fixed optical delay lines 46 each having increasing values of delay (i.e., from left to right), and a plurality of negligible delay bypass stubs 48. A variable delay is created by placing each one of the optical switches 44 in a position which adds a bypass stub 48 to a series chain or in a position which inserts a fixed optical delay line 46 in the series chain. The total delay is the series sum of the individual delays plus the delay associated with each delay bypass stub 48 included in the chain. The switching configuration is in a make-before-break arrangement to provide uninterrupted transmission and reception.

Figure 4:
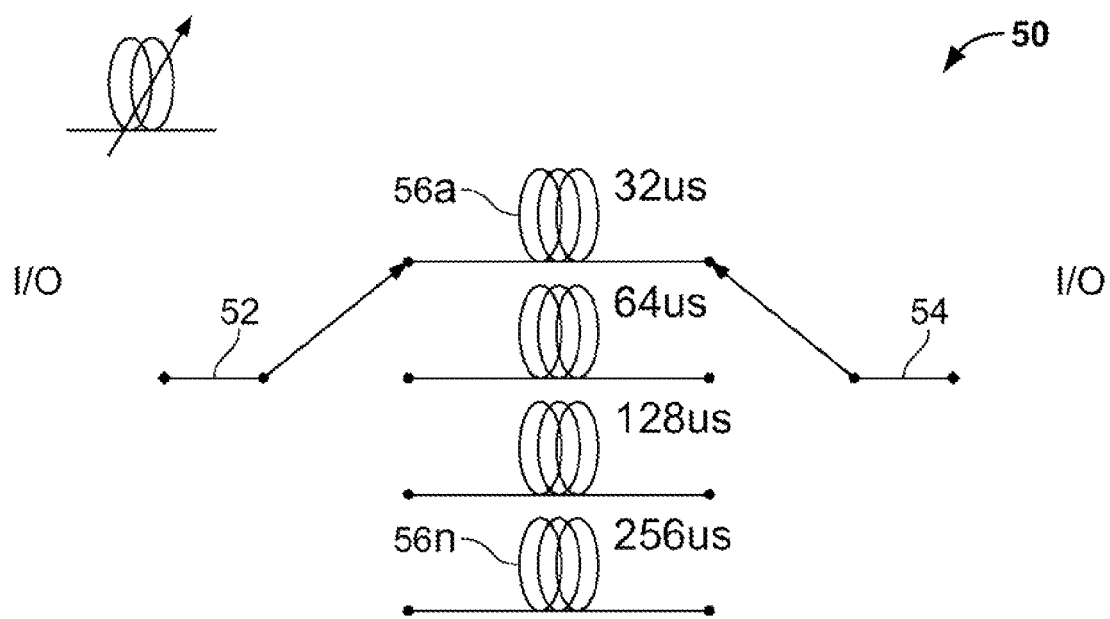
FIG. 4 depicts a schematic block diagram of an exemplary "discrete" variable optical delay line, according to an embodiment of the present invention.

FIG. 4 depicts a schematic block diagram of an exemplary "discrete" variable optical delay line 50, according to an embodiment of the present invention. The discrete variable optical delay line 50 include a pair of multiple position make-before-break optical switches 52, 54 and a plurality of fixed optical delay lines 56a-56n, each having increasing values of delay (i.e., from top to bottom) and arranged in a parallel configuration. A variable delay is created by placing each one of the optical switches 52, 54 in a matching position to insert one of the fixed optical delay lines 56a-56n in the path of input/output. The total delay is the value of the individual selected delay line. Switching needs to be make-before-break to provide uninterrupted transmission and reception.

Figure 5:
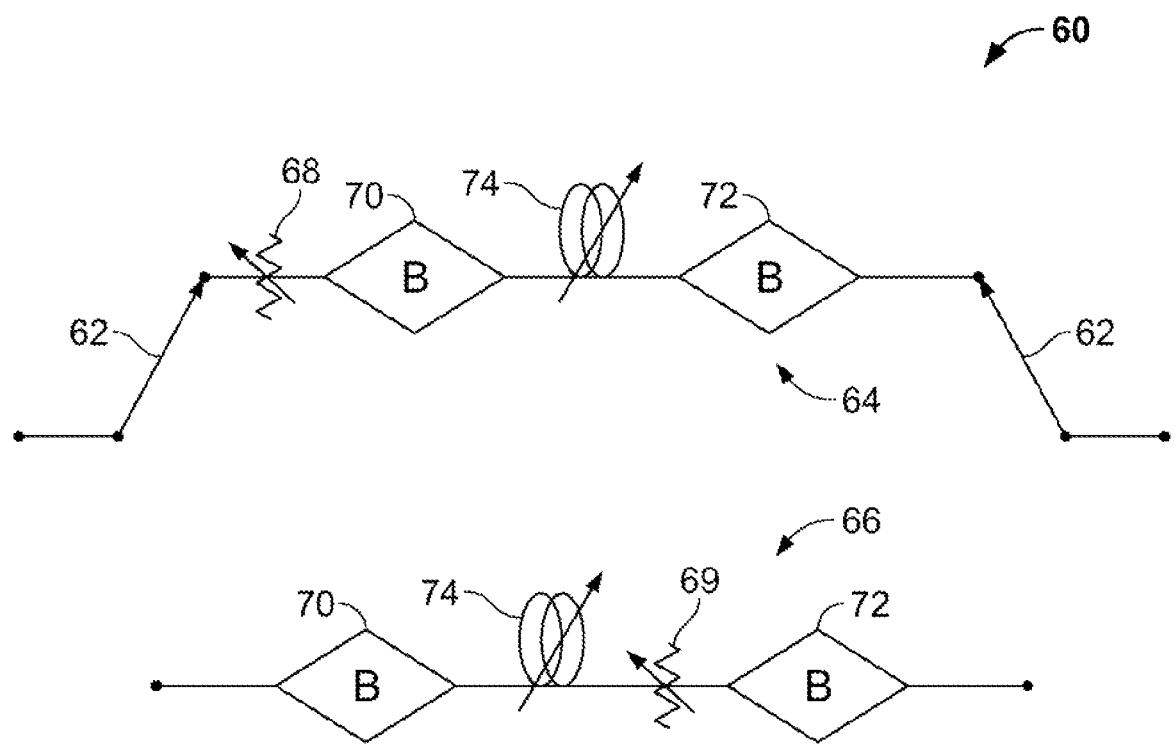
FIG. 5 depicts a bi-directional PPR for two transceivers with fixed or variable delay and amplitude control, according to an embodiment of the present invention.

FIG. 5 depicts a bi-directional PPR 60 for two transceivers with fixed or variable delay and amplitude control, according to an embodiment of the present invention. The PPR 60 includes a pair of make-before-break switches 62 that select between an RF attenuator 64 and an optical attenuator 66. Switching needs to be make-before-break to provide uninterrupted transmission and reception.

Each of the attenuators 64, 66 includes a series connection of an RF or optional attenuation device 68, 69, respectively, a pair of bi-directional modulators/demodulators 70, 72 having the same design as depicted in FIGS. 1 and 2, and a fixed or variable optical delay line 74 having a design as depicted in one of FIG. 3 or 4 and inserted between the pair of bi-directional modulators/demodulators 70, 72 in the optical path shown. One of the attenuators 64, 66 is used to match channel loss.

Figure 6:
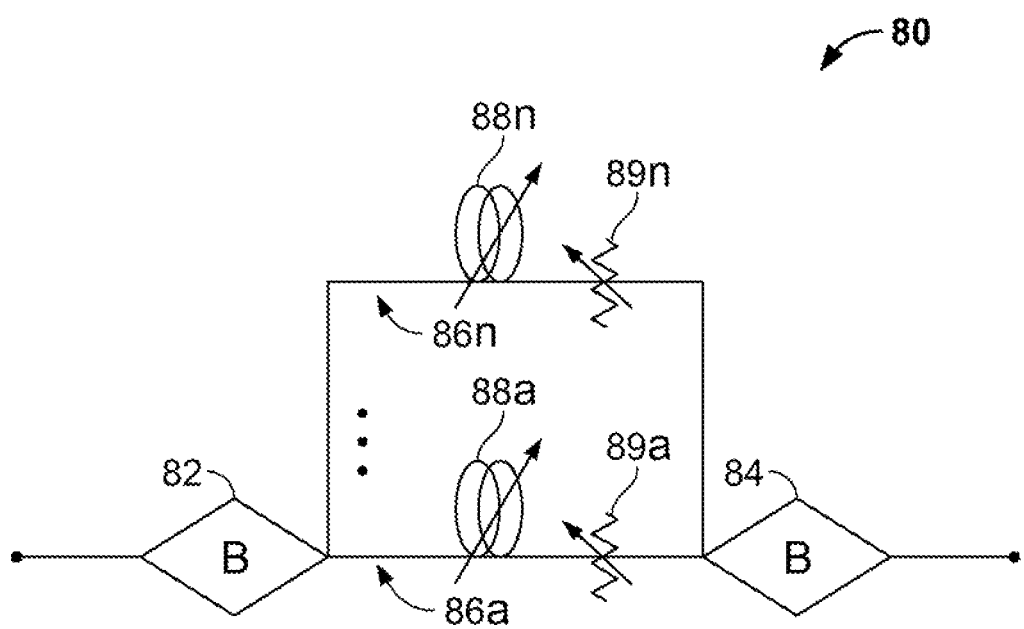
FIG. 6 depicts a bi-directional PPR for two transceivers with fixed or variable delay, amplitude control, and multipath transmission, according to an embodiment of the present invention.

FIG. 6 depicts a bi-directional PPR 80 for two transceivers with fixed or variable delay, amplitude control, and multipath transmission, according to an embodiment of the present invention. The PR 80 includes a pair of bi-directional modulators/demodulators 82, 84, and two or more optical paths 86a-86n, each including a fixed or variable optical delay line 88a-88n having a design as depicted in one of FIG. 3 or 4 and inserted between the pair of bi-directional modulators/demodulators 82, 84 in the optical path 86a-86n shown. Each of the optical paths 86a-86n may also include an optical attenuator 89a-89n. One of the paths 86a is designated as the primary path, while the one or more other paths 86b-86n may have variable attenuation and/or delay to match the effect of a weak signal reflected from different surfaces. The combined variation of attenuation and delay in each of the optical paths 86a-86n may be configured to simulate a moving or stationary multipath signal.

Figure 7:
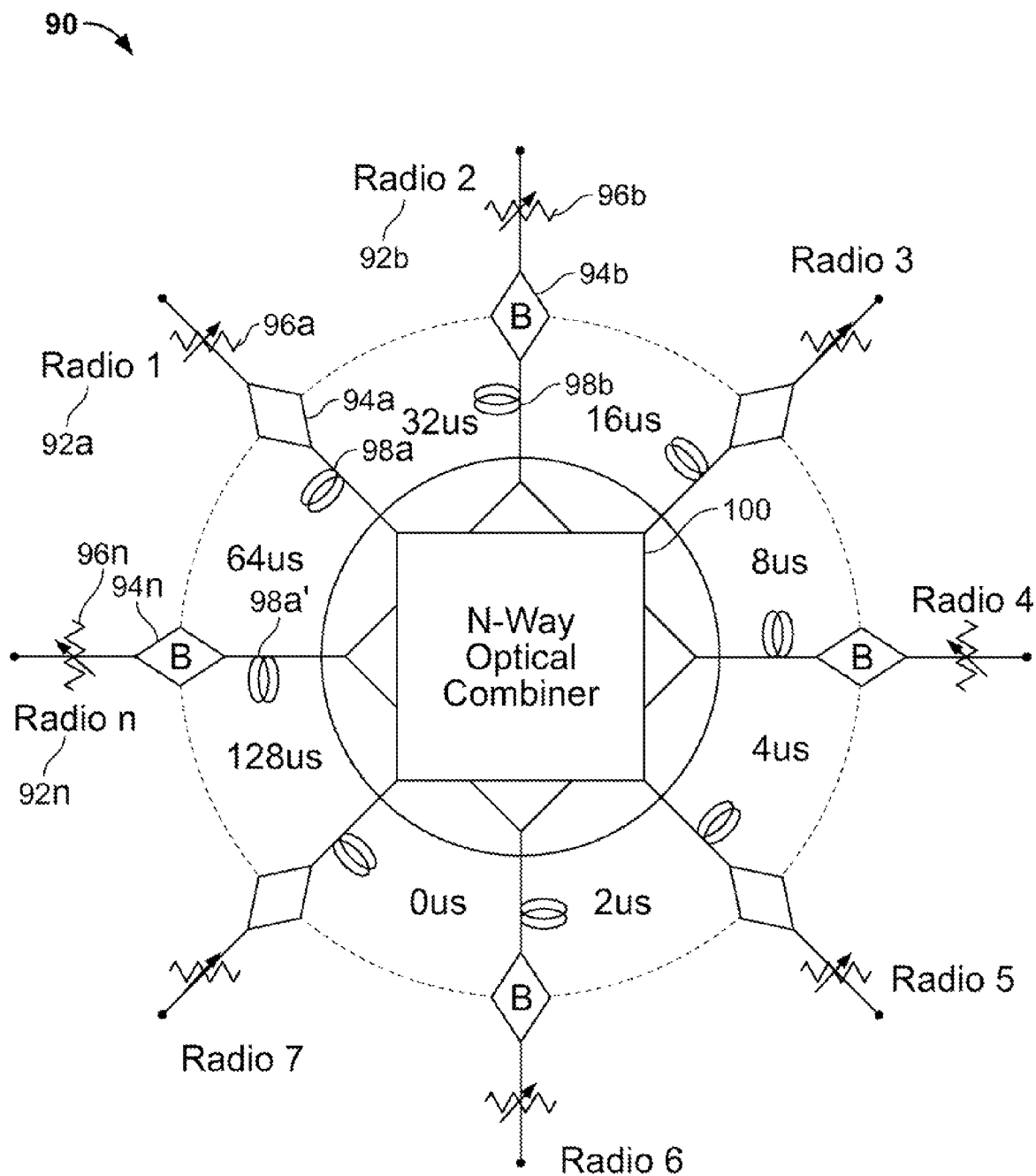
FIG. 7 depicts a multi-directional PPR for two to N transceivers with fixed or variable delay, amplitude control, and multipath transmission, according to an embodiment of the present invention.

FIG. 7 depicts a multi-directional PPR 90 for two to N transceivers with fixed or variable delay, amplitude control, and multipath transmission, according to an embodiment of the present invention. The N-way PPR 90 connects N radios 92a-92N via one each in series of a bi-directional transceiver 94a-94N with an RF attenuator 96a-96N and fixed optical delay line 98a-98N, respectively, as shown, to an N-way optical combiner 100 to be described hereinbelow in connection with FIG. 8. The N-way optical combiner 100 permits up to N radios to be connected to permit remote, programmable radio switching. In a preferred embodiment, N is eight. In a preferred embodiment, the delay values increase in powers of two from 0 μsec to $2^{N-1}$ μsec, although other values and increments for the delays may be employed. Attenuation values may be selected based on fiber and optical combiner losses. In a preferred embodiment, an RF attenuator is employed to reduce cost, but the RF attenuator may be replaced with an optical attenuator in an optical section. According to an embodiment of the present invention, the fixed delays shown in FIG. 7 may be replaced with variable optical delay lines and/or multipath simulators as depicted in FIG. 6 above, according to an embodiment of the present invention.

Figure 8:
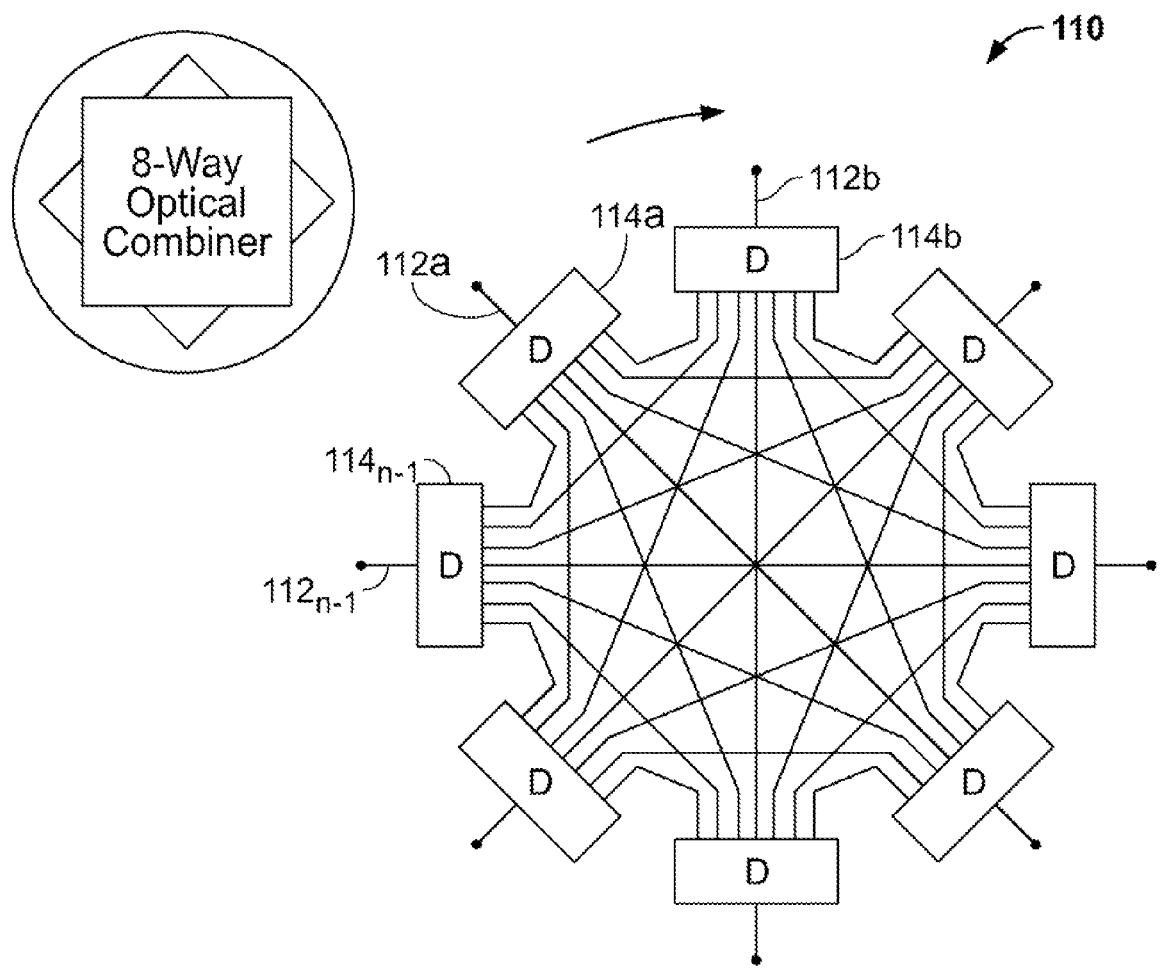
FIG. 8 depicts an N-way optical combiner for use in the multi-directional PPR of FIG. 7, according to an embodiment of the present invention.

FIG. 8 depicts an N-way optical combiner 110 for use in the multi-directional PPR 90 of FIG. 7, according to an embodiment of the present invention. In a preferred embodiment N is 8. Each port 112a-112$_{N-1}$, is configured to receive a bi-directional optical signal that originates from a radio transceiver, and is switched by a 1:N-1 optical splitter-combiner 114a, also labeled D, to any one of the other N-1 ports via a direct optical connection to another of the 1:N-1 optical splitter-combiners 114b-114$_{N-1}$. In a preferred embodiment, the loss through any one of the splitter-combiners 114b-114$_{N-1}$ is no greater than about 11.5 dB. Directivity is at least 55 dB.

Figure 9:
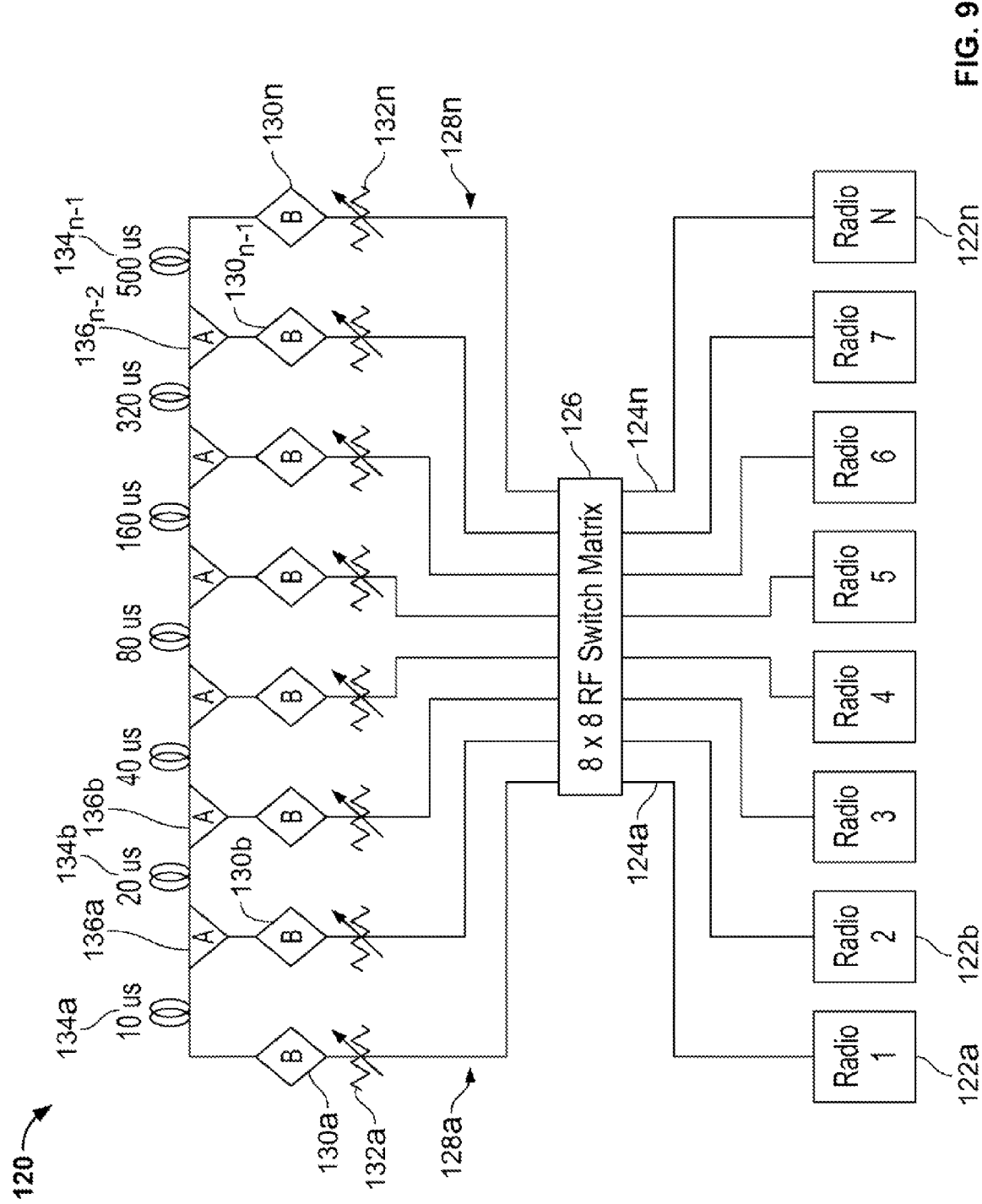
FIG. 9 depicts a second embodiment of a multi-directional PPR for two to N transceivers with fixed or variable delay, amplitude control, and multipath transmission, according to an embodiment of the present invention.

FIG. 9 depicts a second embodiment of a multi-directional PPR 120 for two to N transceivers with fixed or variable delay, amplitude control, and multipath transmission, according to an embodiment of the present invention. The N-way PPR 120 may connect up to N radios 122a-122N to each other via a plurality of corresponding input/output ports 124a-124N of an N×N RF switch matrix 126. In a preferred embodiment, N is eight. Each of the outputs 128a-128N of the N×N RF switch matrix 126 is connected though a set of N shunt paths 128a-128N, each including a bi-directional transceiver 130a-130N and an RF attenuator 132a-132N. The outer two of the bi-directional transceivers 130a, 130n are each connected directly to an optical attenuator 134a, 134$_{N-1}$, while the intervening bi-directional transceiver 130b-130$_{N-1}$ are each connected to one of two optical attenuators 134a-134$_{N-1}$ via one each of 3-way optical splitters 136a-136$_{N-2}$ to be described hereinbelow in connection with FIG. 10.

In a preferred embodiment, the value of a delay line increases from left to right across the multi-directional PPR 120 as shown, although other values and increments for the delays may be employed. In a preferred embodiment, an RF attenuator 132a-132N and the N×N RF switch matrix 126 are employed to reduce cost, but the RF attenuators 132a-132N may be replaced with optical attenuators in the optical sections. Attenuation values are programmably selected to compensate for propagation loss through each of the shunt paths 128a-128N. The splitting and delay losses are not equal through all of the shunt paths 128a-128N, but may be balanced by employing variable values for attenuation in the RF attenuators 132a-132N. Another reason for adding RF attenuators 132a-132N to the shunt paths 128a-128N is to control the amplitude of a signal through a shunt path 128a-128N and to prevent un-wanted loop oscillation for cross-node connections. The RF attenuators 132a-132N also reduce/control the level of the reflected signal back to each of the radios 122a-122N.

Figure 10:
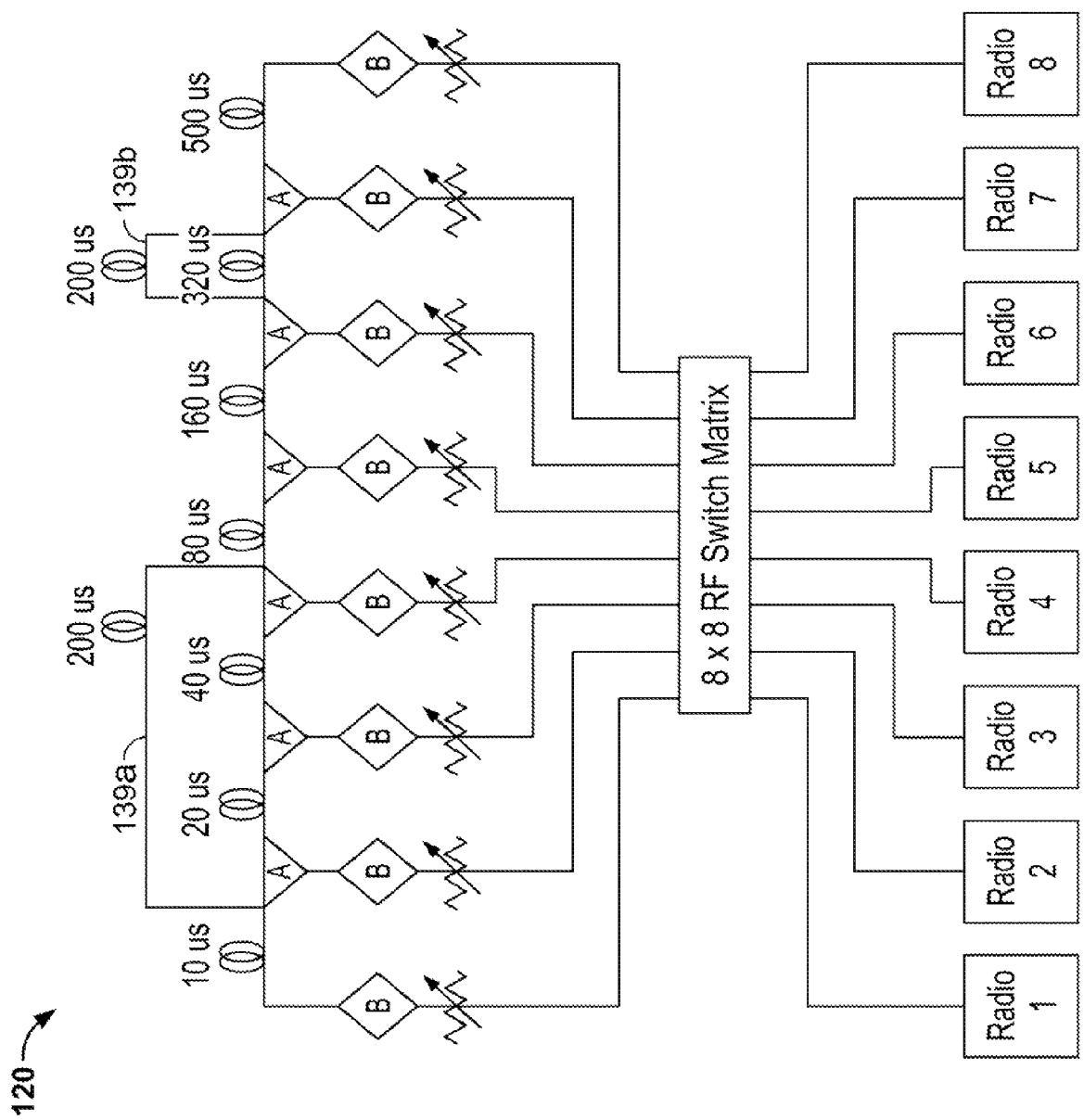
FIG. 10 depicts an exemplary implementation of multipath connections for the circuit of FIG. 9 using parallel delay paths, according to an embodiment of the present invention.

According to an embodiment of the present invention, multipath between the radios 122a-122N may be simulated using parallel delay paths 139a, 139b as shown in FIG. 6 above and FIG. 10. In such circumstances, additional optical splitters (not shown) may be required at junctions of the 3-way optical splitters 136a-136$_{N-2}$.

Figure 11:
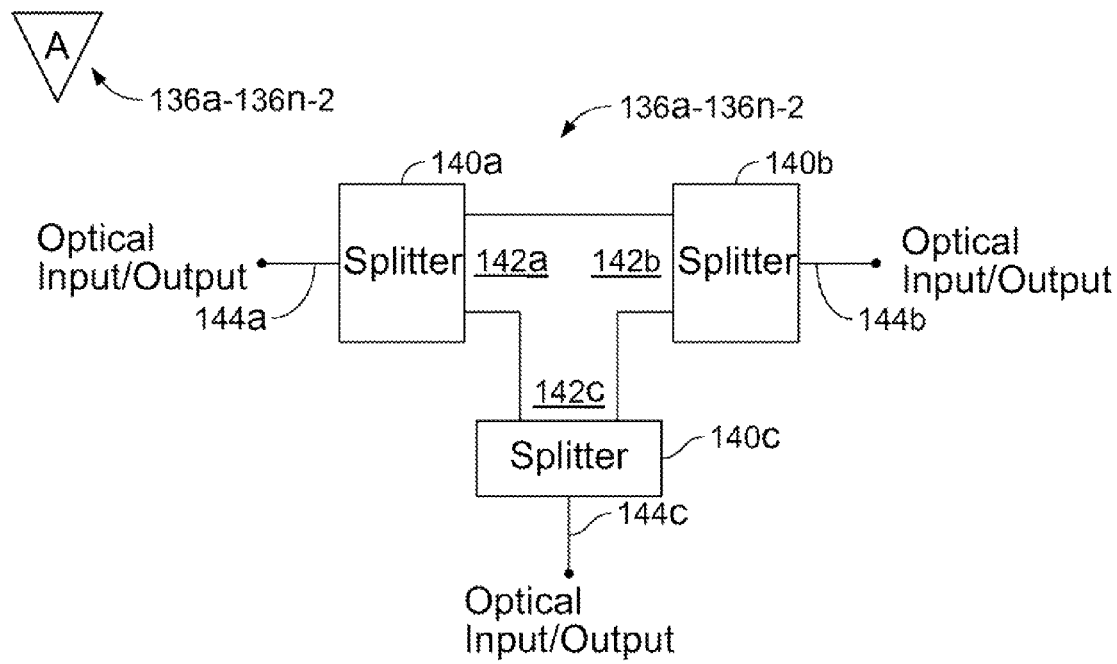
FIG. 11 is a detailed block diagram of a 3-way optical splitter/combiners, according to an embodiment of the present invention.

FIG. 11 is a detailed block diagram of a 3-way optical splitter/combiners 136a-136$_{N-2}$, according to an embodiment of the present invention. The 3-way optical splitter/combiner 136a-136$_{N-2}$ comprises three, 1:2 bi-directional optical splitters 140a-140c connected as shown such that the "2" side 142a-142c of each of the optical splitters 140a-140c is connected to two other "2" sides 142a-142c of each of the other optical splitters 140a-140c. The "1" sides 144a-144c of the optical splitters 140a-140c function as I/O of the overall 3-way optical splitter/combiner 136a-136$_{N-2}$.

Figure 12:
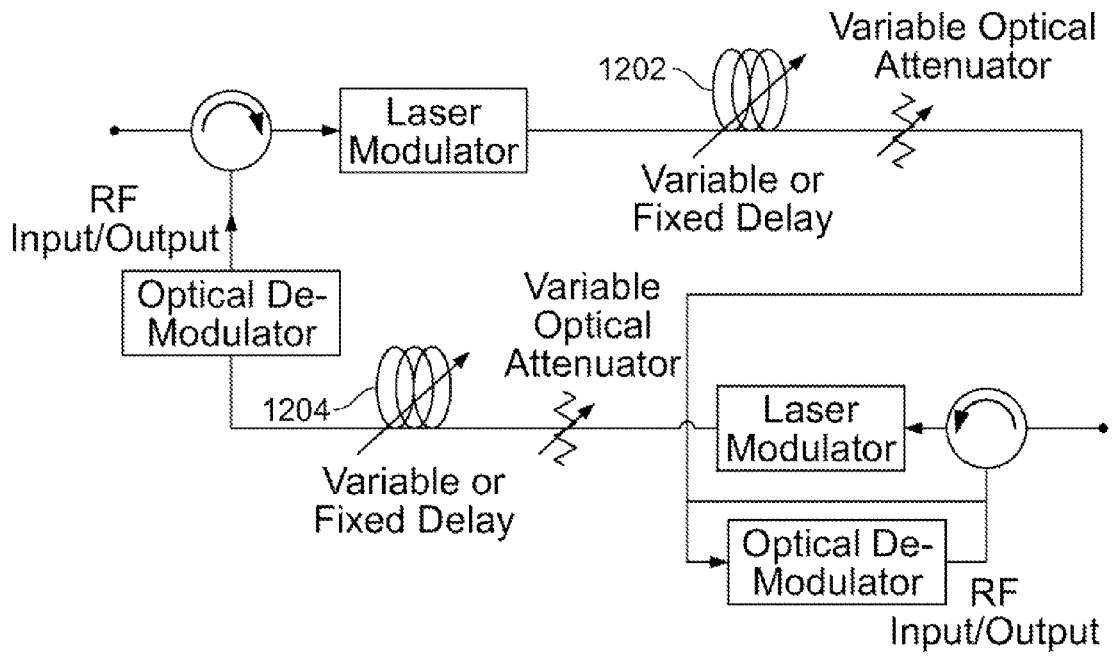
FIG. 12 shows a detailed schematic block diagram of a bi-directional optical modulator/demodulator with two separate fibers, according to an embodiment of the present invention.
Figure 13:
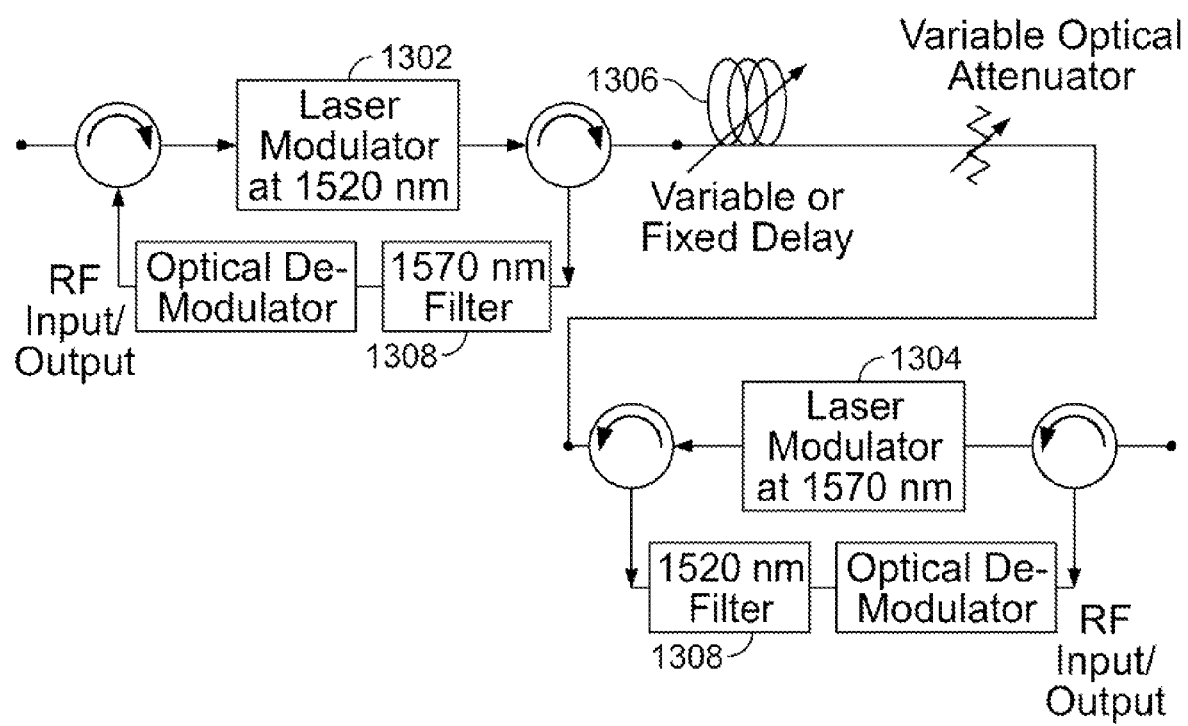
FIG. 13 shows a detailed schematic block diagram of a bi-directional optical modulator/demodulator with frequency discrimination, according to an embodiment of the present invention.

The present invention is subject to numerous variations. Optical isolation of the bi-directional optical modulator/demodulator of FIGS. 2A and 2B may be improved by employing two separate optical delay lines 1202, 1204 (e.g. 580 μsec), one for each direction as shown in FIG. 12. Additionally or alternatively, the bi-directional optical modulator/demodulator of FIGS. 2A and 2B may be improved by employing frequency discrimination as depicted in FIG. 13. FIG. 13 shows the inclusion of two separate 1520 nm and 1560 nm lasers 1302, 1304 along with additional optical fibers 1306, optical filters 1308 to discriminate optical frequencies, and optical amplifiers (Not shown in FIG. 13. See FIG. 2B). Dispersion may be reduced by the addition of dispersion compensation devices (Not shown in FIG. 13. See FIG. 2B), such as a fiber Bragg grating and/or a dispersion compensation fiber. Losses in certain embodiments of the present invention may be reduced by the addition of a free standing fiber coil (not shown), bi-directional fiber amplification, and the 1520 nm and 1560 nm lasers described above.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An apparatus for simulating radio frequency (RF) signal propagation characteristics in a wireless communication network, comprising:
   a first RF terminal;
   a second RF terminal;
   a first optical modulator in electrical communication with the first RF terminal;
   an optical delay line in optical communication with the first optical modulator;
   a first optical demodulator in optical communication with the optical delay line and in electrical communication with the first RF terminal;
   a second optical demodulator in optical communication with the optical delay line and in electrical communication with the second RF terminal; and
   a second optical modulator in electrical communication with the second RF terminal and in optical communication with the optical delay line,
   wherein the first optical modulator and the second optical modulator each comprise:
      an RF isolator;
      a laser in electrical communication with the RF isolator; and
      a circulator in optical communication with the laser and
   wherein the first optical demodulator and the second optical demodulator each comprise:
      a dispersion compensator in optical communication with the circulator;
      a detector in optical communication with the dispersion compensator; and
      a gain stage in optical communication with the detector and in electrical communication with the RF isolator.

2. The apparatus of claim 1, further comprising:
   a first optical filter in optical communication with the optical delay line and the a first optical demodulator; and
   a second optical filter in optical communication with the optical delay line and the second optical demodulator;
   wherein:
      the first optical modulator is configured to transmit a first wavelength;
      the first optical filter is configured to transmit a second wavelength;
      the second optical filter is configured to transmit the first wavelength; and
      the second optical modulator is configured to transmit the second wavelength.

3. The apparatus of claim 1, wherein the optical delay line produces a fixed delay.

4. The apparatus of claim 1, wherein the optical delay line produces a variable delay.

5. The apparatus of claim 4, wherein the optical delay line comprises:
   a plurality of optical delay lines configured in a series configuration, wherein a delay associated with each of the plurality of optical delay lines increases progressively;
   a plurality of bypass stubs each associated with a corresponding one of the plurality of optical delay lines;
   a plurality of two-position optical switches each configured to switch between one of the plurality of optical delay lines and a corresponding one of the plurality of bypass stubs;
   a global bypass stub associated with an input and an output of the plurality of optical delay lines arranged in a series configuration; and
   at least one two-position optical switch configured to switch between the global bypass stub associated with the plurality of optical delay lines and at least one of the plurality of bypass stubs and the plurality of optical delay lines.

6. The apparatus of claim 4, wherein the optical delay line comprises:
   a plurality of optical delay lines configured in a parallel configuration, wherein a delay of each of the plurality of optical delay lines increases progressively; and
   at least one multi-position optical switch configured to switch among each of the plurality of optical delay lines.

7. The apparatus of claim 1, further comprising a variable radio frequency (RF) attenuator in electrical communication with an RF portion of at least one of the first optical modulator, the second optical modulator, the first optical demodulator, and the second optical demodulator.

8. The apparatus of claim 1, further comprising a variable optical attenuator in optical communication with an optical portion of at least one of the first optical modulator, the second optical modulator, the first optical demodulator, and the second optical demodulator.

9. The apparatus of claim 8, further comprising:
   a third RF terminal;
   a fourth RF terminal;
   a third optical modulator in electrical communication with the third RF terminal;
   a second optical delay line in optical communication with the third optical modulator;
   a third optical demodulator in optical communication with the second optical delay line and in electrical communication with the third RF terminal;
   a fourth optical demodulator in optical communication with the second optical delay line and in electrical communication with the fourth RF terminal;
   a fourth optical modulator in electrical communication with the fourth RF terminal and in optical communication with the second optical delay line;
   a variable radio frequency (RF) attenuator in electrical communication with an RF portion of at least one of the third optical modulator, the fourth optical modulator, the third optical demodulator, and the fourth optical demodulator;
   a variable optical attenuator in optical communication with an optical portion of at least one of the third optical modulator, the fourth optical modulator, the third optical demodulator, and the fourth optical demodulator; and at least one switch configured to switch between the first RF terminal and the third RF terminal.

10. The apparatus of claim 8, further comprising:
a second optical delay line in optical communication the first optical modulator; and
a second variable optical attenuator in optical communication with the second optical delay line and the second a second optical modulator.

11. An apparatus for simulating radio frequency (RF) signal propagation characteristics in a wireless communication network, comprising:
a first RF terminal;
a second RF terminal;
a first optical modulator in electrical communication with the first RF terminal;
a first optical delay line in optical communication with the first optical modulator;
a first optical demodulator in optical communication with the first optical delay line and in electrical communication with the second RF terminal;
a second optical modulator in electrical communication with the second RF terminal;
a second optical delay line in optical communication with the second optical modulator; and
a second optical demodulator in optical communication with the second optical delay line and in electrical communication with the first RF terminal,
wherein the first optical modulator and the second optical modulator each comprise:
an RF isolator;
a laser in electrical communication with the RF isolator; and
a circulator in optical communication with the laser and
wherein the first optical demodulator and the second optical demodulator each comprise:
a dispersion compensator in optical communication with the circulator;
a detector in optical communication with the dispersion compensator; and
a gain stage in optical communication with the detector and in electrical communication with the RF isolator.

12. The apparatus of claim 11, wherein at least one of the first and second optical delay line is variable in delay.

13. The apparatus of claim 11, wherein at least one of the first and second optical delay line is in optical communication with a variable optical attenuator.

14. An apparatus for simulating radio frequency (RF) signal propagation characteristics in a wireless communication network, comprising:
a first RF terminal;
a second RF terminal;
a first optical modulator in electrical communication with the first RF terminal;
an optical delay line in optical communication with the first optical modulator, wherein the optical delay line produces a variable delay and wherein the optical delay line comprises:
a plurality of optical delay lines configured in a series configuration, wherein a delay associated with each of the plurality of optical delay lines increases progressively;
a plurality of bypass stubs each associated with a corresponding one of the plurality of optical delay lines;
a plurality of two-position optical switches each configured to switch between one of the plurality of optical delay lines and a corresponding one of the plurality of bypass stubs;
a global bypass stub associated with an input and an output of the plurality of optical delay lines arranged in a series configuration; and
at least one two-position optical switch configured to switch between the global bypass stub associated with the plurality of optical delay lines and at least one of the plurality of bypass stubs and the plurality of optical delay lines;
a first optical demodulator in optical communication with the optical delay line and in electrical communication with the first RF terminal;
a second optical demodulator in optical communication with the optical delay line and in electrical communication with the second RF terminal; and
a second optical modulator in electrical communication with the second RF terminal and in optical communication with the optical delay line.

15. An apparatus for simulating radio frequency (RF) signal propagation characteristics in a wireless communication network, comprising:
a first RF terminal;
a second RF terminal;
a first optical modulator in electrical communication with the first RF terminal;
an optical delay line in optical communication with the first optical modulator;
a first optical demodulator in optical communication with the optical delay line and in electrical communication with the first RF terminal;
a second optical demodulator in optical communication with the optical delay line and in electrical communication with the second RF terminal;
a second optical modulator in electrical communication with the second RF terminal and in optical communication with the optical delay line;
a variable optical attenuator in optical communication with an optical portion of at least one of the first optical modulator, the second optical modulator, the first optical demodulator, and the second optical demodulator;
a third RF terminal;
a fourth RF terminal;
a third optical modulator in electrical communication with the third RF terminal;
a second optical delay line in optical communication with the third optical modulator;
a third optical demodulator in optical communication with the second optical delay line and in electrical communication with the third RF terminal;
a fourth optical demodulator in optical communication with the second optical delay line and in electrical communication with the fourth RF terminal;
a fourth optical modulator in electrical communication with the fourth RF terminal and in optical communication with the second optical delay line;
a variable radio frequency (RF) attenuator in electrical communication with an RF portion of at least one of the third optical modulator, the fourth optical modulator, the third optical demodulator, and the fourth optical demodulator;
a variable optical attenuator in optical communication with an optical portion of at least one of the third optical modulator, the fourth optical modulator, the third optical demodulator, and the fourth optical demodulator; and
at least one switch configured to switch between the first RF terminal and the third RF terminal.

16. An apparatus for simulating radio frequency (RF) signal propagation characteristics in a wireless communication network, comprising:
- a first RF terminal;
- a second RF terminal;
- a first optical modulator in electrical communication with the first RF terminal;
- an optical delay line in optical communication with the first optical modulator;
- a first optical demodulator in optical communication with the optical delay line and in electrical communication with the first RF terminal;
- a second optical demodulator in optical communication with the optical delay line and in electrical communication with the second RF terminal;
- a second optical modulator in electrical communication with the second RF terminal and in optical communication with the optical delay line;
- a variable optical attenuator in optical communication with an optical portion of at least one of the first optical modulator, the second optical modulator, the first optical demodulator, and the second optical demodulator;
- a second optical delay line in optical communication the first optical modulator; and
- a second variable optical attenuator in optical communication with the second optical delay line and the second a second optical modulator.

* * * * *